(12) United States Patent
Baumann et al.

(10) Patent No.: US 12,036,845 B2
(45) Date of Patent: Jul. 16, 2024

(54) AIR VENT FOR A VEHICLE (71) Applicant: ILLINOIS TOOL WORKS INC., Glenview, IL (US)

(72) Inventors: Ulrike Baumann, Winnweiler (DE); Günther Krämer, Enkenbach-Alsenborn (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 269 days.

(21) Appl. No.: 17/294,929

(22) PCT Filed: Nov. 15, 2019

(86) PCT No.: PCT/US2019/061652
§ 371 (c)(1),
(2) Date: May 18, 2021

(87) PCT Pub. No.: WO2020/106563
PCT Pub. Date: May 28, 2020

(65) Prior Publication Data
US 2022/0009315 A1 Jan. 13, 2022

(30) Foreign Application Priority Data
Nov. 23, 2018 (DE) .................. 10 2018 129 562.6

(51) Int. Cl.
*B60H 1/34* (2006.01)
(52) U.S. Cl.
CPC .................. *B60H 1/3421* (2013.01)
(58) Field of Classification Search
CPC .................. B60H 1/3421
USPC .................. 454/154
See application file for complete search history.

(56) References Cited

U.S. PATENT DOCUMENTS

| 9,989,275 B2* | 6/2018 | Oe | B60H 1/3421 |
| 10,792,982 B2* | 10/2020 | Lee | B60H 1/247 |
| 11,065,939 B2* | 7/2021 | Lee | B60H 1/3421 |
| 2013/0178141 A1 | 7/2013 | Hoke | |
| 2014/0302769 A1 | 10/2014 | Sawada | |
| 2015/0174989 A1* | 6/2015 | Oe | F24F 13/14 454/152 |

(Continued)

FOREIGN PATENT DOCUMENTS

| CN | 102815184 A | 12/2012 |
| CN | 203110886 U | 8/2013 |

(Continued)

OTHER PUBLICATIONS

PCT, International Search Report and Written Opinion, International Application No. PCT/US2019/061652; dated Feb. 24, 2020, 12 pages.

*Primary Examiner* — Avinash A Savani
*Assistant Examiner* — Dana K Tighe
(74) *Attorney, Agent, or Firm* — THOMPSON HINE LLP (57) ABSTRACT

An air vent (1) for a vehicle, wherein the air vent (1) has a housing whose housing wall (5a, 5b) regionally delimits an air duct (3) for air flowing through the air vent (1) along a main flow direction (H), wherein at least one region (7, 8) of the housing wall (5a, 5b) is designed adaptively such that said region (7, 8) is able to be moved out into the air duct (3) and/or pivoted into the air duct (3), as required, in order to deflect the air, flowing through the air duct (3), from the main flow direction (H).

14 Claims, 4 Drawing Sheets

(56) References Cited

U.S. PATENT DOCUMENTS

2018/0354346 A1    12/2018    Demerath

FOREIGN PATENT DOCUMENTS

| | | |
|---|---|---|
| CN | 105252989 A | 1/2016 |
| CN | 105644302 A | 6/2016 |
| CN | 106488854 A | 3/2017 |
| CN | 106739965 A | 5/2017 |
| CN | 108790704 A | 11/2018 |
| DE | 202010009031 U1 | 10/2010 |
| DE | 102007036532 B4 | 4/2011 |
| DE | 102011120877 A1 | 6/2013 |
| DE | 202013100019 U1 | 6/2013 |
| DE | 202015102026 U1 | 6/2015 |
| DE | 102014001959 A1 | 8/2015 |
| DE | 202013012285 U1 | 1/2016 |
| DE | 102017111011 A1 | 7/2017 |
| DE | 102016214186 A1 | 2/2018 |
| DE | 102017112616 A1 | 12/2018 |
| EP | 2777966 A1 | 9/2014 |
| JP | 2016135673 A | 7/2016 |

\* cited by examiner

FIG. 8

AIR VENT FOR A VEHICLE

TECHNICAL FIELD

The present invention relates to an air vent in particular for a venting system of a vehicle. The invention furthermore relates to a venting system with such an air vent.

BACKGROUND

In general, air vents or air outlet nozzles which enable targeted control of the escaping air jet are used in the case of venting devices for vehicles. Such air vents serve, for example, the purpose of supplying in particular fresh air into a vehicle interior.

The air flow flows via an inlet opening of the air vent into the air duct delimited by the housing wall of the air vent, through this and finally through the outlet opening of the air vent into the interior of a vehicle (for example, car or HGV). The air flow follows fundamentally a main flow direction which can extend in particular parallel to a longitudinal axis of the housing.

A deflection of the air flow from the main flow direction is performed in the case of known air vents by one or more pivotable air-guiding slats. In addition to the air-guiding slats, the housing, which delimits the air duct, of the air vent can also serve to deflect the air from the main flow direction.

For example, air vents are thus known, whose housing walls taper towards one another in an arc-like manner, wherein an air flow directed by a slat onto the arcuate housing wall follows the arc shape and thus undergoes a corresponding deflection.

Such air vents are known, for example, from DE 20 2015 102 026 U1, DE 20 2013 012 285 U1, or DE 10 2017 111 011 A1.

As a result of the arc-shaped configuration of the housing wall, such air vents are, however, very complex to produce and mount. The housing of such air vents is furthermore significantly higher than the actual air outlet. As a result of this, it becomes necessary to mount the air vent either from the rear into the vehicle interior or cover the mounting opening with a large panel. However, this is not consistent with acceptable service costs and installation space requirements, for example, in competition with large displays.

On the other hand, air vents are also known, whose housing walls are formed substantially parallel to the main flow direction of an air flow flowing through the air vent. In this context, reference is made, for example, to DE 10 2016 214 186 A1 or DE 10 2007 036 532 D4.

In the case of these air vents known in general from the prior art which have a housing whose housing wall at least regionally delimits an air duct for air flowing through the air vent along a main flow direction, wherein the housing wall extends substantially parallel to the main flow direction of the air flowing through the air vent, but a deflection which occurs where necessary of the air flowing through the air vent along the main flow direction with the aid of at least one air-guiding slat which is pivotable or rotatable relative to the housing wall is not optimal in terms of the flow resistance.

This applies in particular if the height of the air vent and thus a dimension of the effective flow cross section of the air vent is reduced. In the case of such narrow air vents with a height of less than 50 mm, preferably less than 35 mm and even more preferably less than 20 mm, turbulence necessarily occurs in the case of a deflection, brought about with an air-guiding slat, of the air flow through the air vent from the main flow direction, which turbulence leads to an increased flow resistance and very loud flow noises

SUMMARY

Proceeding from this problem, the object of the present invention is thus to further develop an air vent of the above-mentioned type such that, in particular in the case of a small height of the air vent, an optimized air deflection is ensured as before, wherein in particular the air deflection does not lead to an undesirable widening of the air flow at the outlet opening of the air vent, and wherein furthermore in particular only a low flow resistance is present and in the case of air deflection only a low development of noise is to be expected.

This object is achieved according to the invention by the subject matter of independent claim 1, wherein advantageous further developments of the air vent according to the invention are indicated in the dependent claims.

The invention accordingly relates in particular to an air vent for a vehicle, wherein the air vent has a housing whose housing wall at least regionally delimits an air duct for air flowing through the air vent along a main flow direction. Optionally, at least one and preferably precisely one air-guiding slat can be mounted or arranged pivotably about an axis of rotation relative to the house in the air duct. At least one region of the housing wall, which region—in so far as an air-guiding slat is supposed to be provided—preferably lies in a plane extending parallel to the axis of rotation of the air-guiding slat, is designed adaptively such that said region is able to be moved out into the air duct and/or pivoted into the air duct, as required, in order to deflect the air, flowing through the air duct, from the main flow direction.

In conceivable realizations of the air vent according to the invention, it is provided that the at least one adaptive region of the housing wall is designed in the form of an air-guiding element, wherein the air-guiding element is arranged on a main body of the housing or integrated in a main body of the housing and is able to be pivoted relative to the main body of the housing about an axis of rotation extending perpendicular to the main flow direction.

Alternatively or in addition to this, the at least one adaptive region, preferably designed in the form of an air-guiding element, of the housing wall is arranged, at least partially and/or regionally, in a groove-shaped region, which preferably extends perpendicular to the main flow direction and is formed in the main body of the housing, and is able to be moved out or pivoted, at least partially, from the groove-shaped region into the air flowing through the air duct as required.

According to embodiments of the air vent according to the invention, said air vent can have at least one air-guiding slat in addition to the at least one adaptive region of the housing wall. For example, in the air duct of the air vent, at least one air-guiding slat can be arranged in a manner pivotable relative to the housing about an axis of rotation. In the case of this embodiment, it is preferred if the at least one adaptive region of the housing wall lies in a plane extending parallel to the axis of rotation of the at least one air-guiding slat.

In the case of embodiments in the case of which the air vent according to the invention has at least one air-guiding slat in addition to the at least one adaptive region of the housing wall, the at least one adaptive region of the housing wall can be operatively coupled to the at least one air-guiding slat, in particular such that the at least one adaptive region of the housing wall is moved out into the air duct, and/or pivoted into the air duct, in dependence on the direction in which the at least one air-guiding slat is pivoted relative to the housing and/or in dependence on the degree of the deflection of the at least one air-guiding slat.

The advantages which can be achieved with the solution according to the invention are obvious: due to the fact that the housing wall of the housing of the air vent according to the invention is designed to be at least regionally adaptive, the housing wall can at all times take on a configuration which is optimized in terms of the air flowing through the air vent, which configuration serves in particular to achieve an optimized and effective air deflection of the air flowing through the air vent, and indeed also if the air duct of the air vent is formed to be very flat.

The at least one adaptive region of the housing wall thus makes it possible to transfer the advantages which can be achieved in the case of air vents with an arc-shaped configuration of the housing wall to air vents with straight housing walls. This in turn makes it possible to reduce the installation height of the air vent and in particular reduce it to a height of less than 20 mm without as a result the possibility of an air deflection of the air flowing through the air vent being lost.

In this manner, it is possible to realize air vents with a low height along with the same functionality in terms of deflection, air throughput and acoustics. In particular the at least one adaptive region of the housing wall is formed to shape an air-guiding bulge which is suitable to optimally deflect the air flow in interaction with other air-guiding elements and in particular in interaction with the stated air-guiding slat. It would also be conceivable in this context that at least one adaptive region of the housing wall is formed to shape an air-guiding bulge as a function of the position of an air-guiding slat arranged in the air duct. "Optimal" means in this context achieving an effective deflection of the air flow. The flow resistance and the development of noise can furthermore be reduced by the adaptive region of the housing wall.

At the same time, the total cross section in the housing can remain almost equally narrow as a result of the at least one adaptive region of the housing wall. As a result of this, it is possible to embody the housing of the air vent to be substantially rectangular with almost the same height. In this manner, mounting from the front side of the vehicle interior becomes possible without panels with a large surface area being required for this. This in turn makes it possible for further functional elements such as, for example, screens, etc., to be installed in the region of the air vent, in particular in the vehicle control console or in the dashboard.

It furthermore becomes possible to position such flat air vents in regions in the vehicle in which hitherto no air vents with a full functional scope were possible. Air vents in the roof liner and also in the B pillar should in particular be mentioned here.

According to embodiments of the air vent according to the invention, it is provided that the at least one adaptive region of the housing wall is formed in a region of the housing wall—as seen in the main flow direction of the air flowing through the air vent—downstream of a virtual line extending orthogonal to the main flow direction. If the air vent according to the invention has at least one air-guiding slat in addition to the at least one adaptive region of the housing wall, this virtual line can preferably extend parallel to the axis of rotation of the at least one air-guiding slat and is preferably oriented orthogonally with respect to the main flow direction.

By virtue of the fact that, according to embodiments of the air vent according to the invention, the at least one adaptive region of the housing wall—as seen in the flow direction—is arranged downstream of an air-guiding slat arranged preferably in the air duct, a particularly compact design of the air vent can be realized, which can be vital in order to be able to reduce the height of the air vent. However, other arrangements and positionings of the at least one adaptive region of the housing wall relative to the at least one air-guiding slat are of course also conceivable here.

According to embodiments of the air vent according to the invention, it is provided that the at least one adaptive region of the housing wall is designed in the form of an air-guiding element. Said air-guiding element can be formed from a flexible material so that adaptation, where necessary, of the housing wall is possible.

Alternatively or in addition to this, it is conceivable in this context if the at least one adaptive region of the housing wall is formed as a relatively rigid air-guiding element which has a dimension which extends perpendicular to the main flow direction which corresponds preferably at least substantially to the dimension extending perpendicular to the main flow direction of the at least one air-guiding slat.

The adaptive region of the housing wall designed in the form of an air-guiding element can be arranged on a main body of the housing or integrated in a main body of the housing and is able to be moved into the air flow preferably relative to the main body of the housing where necessary. For example, it is conceivable in this context if the at least one adaptive region of the housing wall designed in the form of an air-guiding element is able to be pivoted into the air flow about an axis of rotation extending perpendicular to the main flow direction.

According to possible realizations of the latter embodiment of the air vent according to the invention, it is provided that the at least one adaptive region, preferably designed in the form of an air-guiding element, of the housing wall is arranged, at least partially and/or regionally, in a groove-shaped region, which extends perpendicular to the main flow direction and is formed in the main body of the housing. As a result of this, at least in the straight-ahead position of the at least one air-guiding slat, the air-guiding element of the adaptive region of the housing wall is able to be moved out, at least regionally, from the air flow flowing through the air duct in order to thus reduce the flow resistance and a corresponding development of noise.

It is preferably provided that the at least one adaptive region, preferably designed in the form of an air-guiding element, of the housing wall is able to be moved out or pivoted, at least partially, from the groove-shaped region of the main body of the housing into the air flowing through the air duct in order to bring about an influence on flow as required.

In order to be able to bring about optimum deflection of the air flowing through the air duct inside the air vent, the at least one adaptive region of the housing wall preferably has a surface which points in the direction of the air duct and which is, at least partially or regionally, embodied to be complementary with the surface of the air-guiding slat which points in the direction of the at least one adaptive region of the housing wall. In this manner, a constant air duct can be formed between the at least one adaptive region of the housing wall and the air-guiding slat, which constant air duct enables a laminar air flow.

According to preferred realizations of the air vent according to the invention, the at least one adaptive region of the housing wall has a surface which points in the direction of the air duct and which is, at least regionally, of concave form.

In order to achieve that where necessary the at least one adaptive region of the housing wall can interact optimally with the at least one air-guiding slat in terms of a desired air deflection, it is provided that the at least one adaptive region, preferably designed in the form of an air-guiding element, of the housing wall is able to be pivoted about an axis of rotation extending perpendicular to the main flow direction not only relative to the housing or the main body of the housing, but also relative to the at least one air-guiding slat.

In one embodiment of the air vent according to the invention which is particularly easy to realize but is still effective, it is provided that an actuation mechanism, in particular a mechanical actuation mechanism, such as, for example, a manually actuated actuation mechanism or an electric motor-actuated actuation mechanism, is assigned to the at least one air-guiding slat for the purpose of pivoting the at least one air-guiding slat relative to the housing wall of the air vent as required, and in this manner to bring about a desired deflection of the airflow from the main flow direction.

The at least one adaptive region, preferably designed in the form of an air-guiding element, of the housing wall is preferably operatively coupled (for example, mechanically operatively coupled) to the at least one air-guiding slat or to the actuation mechanism assigned to the at least one air-guiding slat such that, when the at least one air-guiding slat is pivoted about its axis of rotation relative to the housing of the air vent, the at least one adaptive region preferably designed in the form of an air-guiding element is also pivoted about its axis of rotation, wherein this pivoting movement is performed synchronously or asynchronously, in particular partially asynchronously with the pivoting movement of the at least one air-guiding slat.

In order to achieve an optimized air deflection in at least two opposite directions relative to the main flow direction, according to embodiments of the air vent according to the invention, it is provided that said air vent has a first air-guiding element, designed in the form of an adaptive region of the housing wall, and a (additional) second air-guiding element, designed in the form of an adaptive region of the housing wall.

The two air-guiding elements are preferably arranged opposite one another, wherein the air-guiding elements can also be arranged opposite one another in an offset manner.

According to embodiments of the air vent according to the invention, said air vent has at least one and preferably precisely one air-guiding slat which is arranged in the air duct of the air vent to be pivotable about an axis of rotation relative to the housing. In this context, it would be conceivable if the at least one air-guiding slat is arranged, at least regionally, between the first and second air-guiding elements such that in this manner in each case a sub-duct is formed between the air-guiding slat and the first air-guiding element on one hand and the air-guiding slat and the second air-guiding element on the other hand, which sub-ducts are also referred to below as the first sub-duct and second sub-duct.

According to further developments of the latter embodiment of the air vent according to the invention, in the case of which two opposite adaptive regions in the form of a first and a second air-guiding element are provided, an in particular mechanical operative coupling is used via which the first and second air-guiding elements are operatively coupled to the air-guiding slat or an actuation mechanism assigned to the air-guiding slat.

The operative coupling between the first and second air-guiding elements to the air-guiding slat or the actuation mechanism assigned to the air-guiding slat is preferably selected such that, in a state in which the air-guiding slat is, with respect to the main flow direction, in its straight-ahead position, a first sub-duct is formed between the first air-guiding element and the air-guiding slat and a second sub-duct is formed between the second air-guiding element and the air-guiding slat, and such that, in a state in which the air-guiding slat is, about its axis of rotation, pivoted relative to the housing in the direction of the first air-guiding element, the effective flow cross section of the first sub-duct is reduced in comparison with the effective flow cross section in the case of the straight-ahead position of the air-guiding slat, while the effective flow cross section of the second sub-duct preferably remains, at least substantially, unchanged in comparison with the effective flow cross section of the second sub-duct in the case of the straight-ahead position of the air-guiding slat.

According to preferred realizations of the air vent according to the invention, it is in particular provided that the first and second air-guiding elements are operatively coupled to the air-guiding slat or to the actuation mechanism assigned to the air-guiding slat such that, in a state in which the air-guiding slat is, about its axis of rotation, pivoted relative to the housing to a maximum extent in the direction of the first air-guiding element, the first sub-duct is blocked by the first air-guiding element (i.e. the effective flow cross section of the first sub-duct is preferably reduced to zero), wherein, however, the effective flow cross section of the second duct is preferably at least substantially unchanged in comparison with the effective flow cross section of the second sub-duct in the straight-ahead position of the air-guiding slat. The blocking of the first sub-duct is performed by sufficient movement, in particular pivoting of the first air-guiding element into the air duct and in the direction of the air-guiding slat.

Due to the fact that, in this position adjusted to a maximum extent of the air-guiding slat, the corresponding sub-duct is closed, it can be effectively prevented that some of the air flowing through the housing of the air vent strikes that wall region of the housing in which the first air-guiding element is arranged or integrated, which inevitably has a negative influence on air deflection.

In one alternative embodiment of the air vent according to the invention, it is provided that said air vent has a first air-guiding element, designed as an adaptive region of the housing wall, and a second air-guiding element, also designed as an adaptive region of the housing wall, wherein these two air-guiding elements are opposite one another. The two air-guiding elements can in particular also be opposite one another in an offset manner.

Although this should not be regarded as restrictive, it is conceivable that, in the case of this embodiment of the air vent, also at least one and preferably precisely one air-guiding slat is used which is arranged in the air duct of the air vent pivotably about an axis of rotation relative to the housing of the air vent.

In contrast to the embodiment described above of the air vent according to the invention, it can nevertheless be provided in the case of this embodiment that the two air-guiding elements designed in the form of adaptive regions of the housing wall are arranged downstream of the at least one air-guiding slat.

In the case of this embodiment, an operative coupling is preferably likewise provided between the air-guiding slat and the first and second air-guiding element or between an actuation mechanism assigned to the air-guiding slat and the first and second air-guiding element in order to be able to realize a coordinated interaction of the movements of the air-guiding elements and the air-guiding slat.

According to conceivable realizations of this operative coupling, it is provided that, if the air-guiding slat is in its straight-ahead position, a first sub-duct is formed between the air-guiding slat and the housing and a second sub-duct extending parallel to the first sub-duct is formed. In a state in which the air-guiding slat is pivoted about its axis of rotation relative to the housing in the direction of that housing wall in which the first air-guiding element, designed as an adaptive region, is provided, the effective flow cross section of the second sub-duct is reduced and the first air-guiding element is pivoted into the air duct.

BRIEF DESCRIPTION OF THE DRAWINGS

Exemplary embodiments of the air vent according to the invention are described below with reference to the enclosed drawings.

In the drawings.

DETAILED DESCRIPTION

Figure 1:
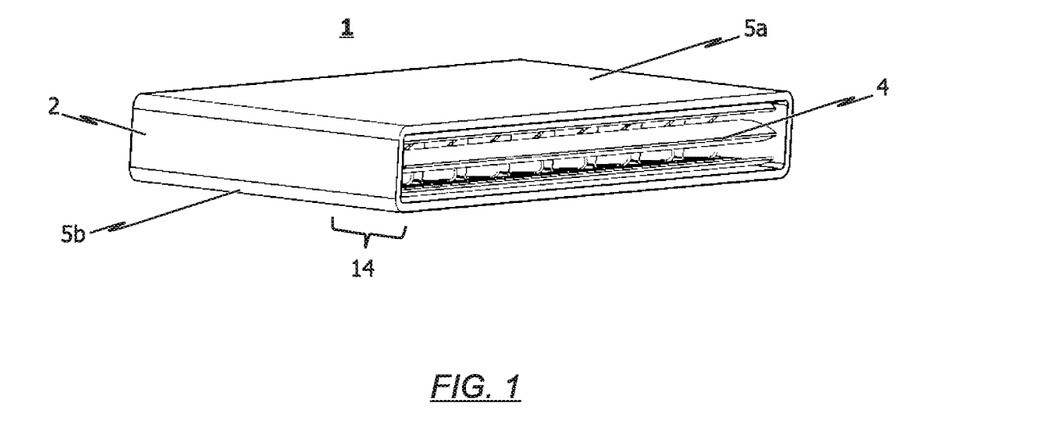
FIG. 1 shows schematically and in an isometric view a first exemplary embodiment of the air vent according to the invention in the neutral position.

A first exemplary embodiment of air vent 1 according to the invention is described in greater detail below with reference to the representations in FIGS. 1 to 4. To be more precise, FIGS. 1 and 2 show air vent 1 according to the invention according to the first exemplary embodiment in the neutral position, while air vent 1 is shown in a maximal position in FIGS. 3 and 4.

Air vent 1 has a housing 2 with a housing main body 11. Although not represented in the drawings, it is in principle conceivable if housing main body 11 is divided into a housing lower part and a housing upper part which is detachable from the housing lower part. Air vent 1 can also have a panel which is connected or can be connected to housing 2.

Housing 2 has an air inlet region with a (single) air inlet opening and an air outlet region or outflow region 14 opposite the air inlet region. In the case of the air outlet region or outflow region 14, a total of two air outlet openings arranged on top of one another in this case are provided.

Figure 2:
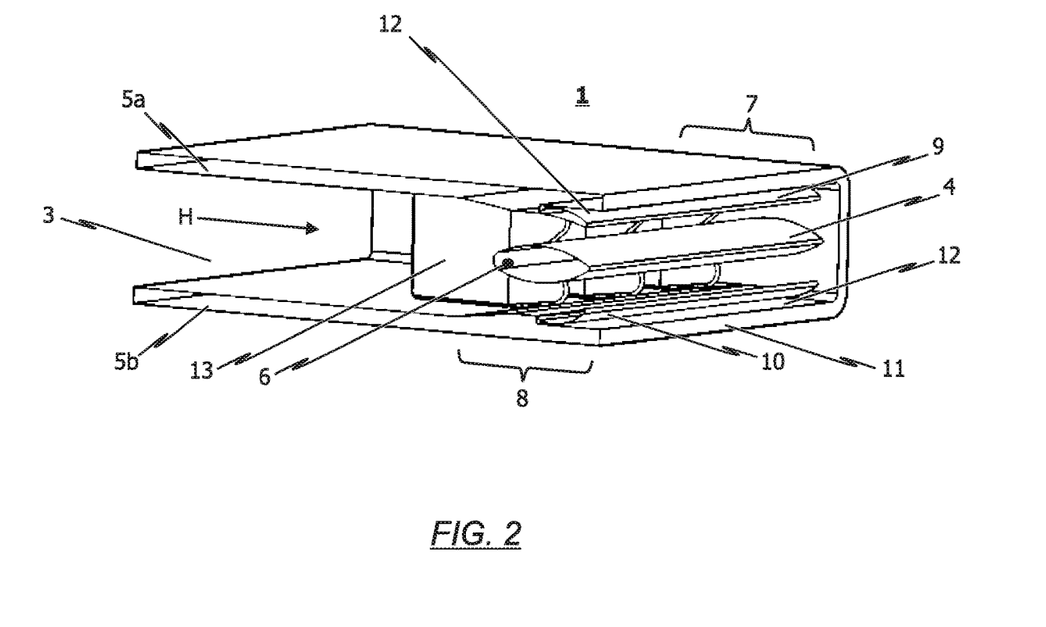
FIG. 2 shows schematically and in an isometric and partially sectional view the air vent according to FIG. 1.

As can be inferred from the schematic sectional view, for example, according to FIG. 2, a single air duct 3 is preferably formed by housing wall 5a, 5b of housing 2 in an end region of air vent 1 which faces the air inlet region of air vent 1. To be more precise, in this exemplary embodiment, an upper housing wall 5a and a lower housing wall 5b opposite upper housing wall 5a delimit air duct 3 for air flowing from the air inlet opening along a main flow direction H.

As seen in main flow direction H, air vent 1 is divided substantially into two regions: in a first region which faces the air inlet region of air vent 1, a mechanism for horizontal air deflection of the air flowing through air duct 3 along a main flow direction H is provided. This mechanism for horizontal air deflection has at least one and preferably a plurality of vertical air-guiding slats arranged parallel to one another, which air-guiding slats are pivotable relative to housing 2 of air vent 1 about an axis of rotation extending perpendicular to main flow direction H.

The second region of air vent 1 is arranged immediately adjacent to the first region of air vent 1 and serves the purpose of vertical air deflection. An air-guiding slat 4 which is arranged substantially centrally in air duct 3 and is in the neutral position according to FIGS. 1 and 2 substantially in a horizontal plane is used for this purpose. Said air-guiding slat 4 is mounted in a pivotable manner about an axis of rotation 6 relative to housing 2.

A first sub-duct for the air flowing through air vent 1 is formed between air-guiding slat 4 and upper housing wall 5a, while a second sub-duct is formed between air-guiding slat 4 and lower housing wall 5b. In the neutral position, i.e. in the position in which air-guiding slat 4 is in its straight-ahead position in relation to main flow direction H, the two sub-ducts preferably have a substantially identical effective flow cross section.

At least one region of the housing wall of housing 2, and in particular at least one region of the upper or lower housing wall 5a, 5b, i.e. that housing wall 5a, 5b which lies in a plane extending parallel to axis of rotation 6 of air-guiding slat 4, is formed to be adaptive according to the invention.

To be more precise, in the case of the first exemplary embodiment of air vent 1 according to the invention shown in the drawings, it is provided that both upper and lower housing walls 5a, 5b of housing 2 of air vent 1 according to the invention have in each case an adaptive region 7, 8.

Each adaptive region 7, 8 is formed such that corresponding adaptive region 7, 8 is moved out and in particular pivoted out of its straight-ahead position into air duct 3, in dependence on the direction in which air-guiding slat 4 is pivoted relative to housing 2 of air vent 1 and in dependence on the degree of the deflection of air-guiding slat 4. In this manner, the air deflection of the air flowing through air vent 1 can where necessary be improved.

As can be inferred from the representation in FIG. 2, both adaptive regions 7, 8 of upper and lower housing wall 5a, 5b are formed in each case in a region of corresponding housing wall 5a, 5b downstream of a virtual line extending orthogonally to main flow direction H. This virtual line extends parallel to axis of rotation 6 of air-guiding slat 4 and is oriented in particular orthogonally in relation to main flow direction H.

Although this should not be regarded as a restriction, it is provided in the case of the exemplary embodiments of air vent 1 according to the invention that respective adaptive regions 7, 8 of the housing walls are formed in each case as air-guiding element 9, 10 or have in each case an air-guiding element 9, 10 which have in each case a dimension extending perpendicular to main flow direction H which corresponds at least substantially to the dimension of air-guiding slat 4 extending perpendicular to main flow direction H.

On the other hand, adaptive regions 7, 8 designed in the form of air-guiding elements 9, 10 can be arranged on a main body 11 of housing 2 of air vent 1 or integrated in a main body 11 of housing 2 of air vent 1 and are able to be pivoted relative to main body 11 of housing 2 about an axis of rotation extending substantially perpendicular to main flow direction H.

Figure 4:
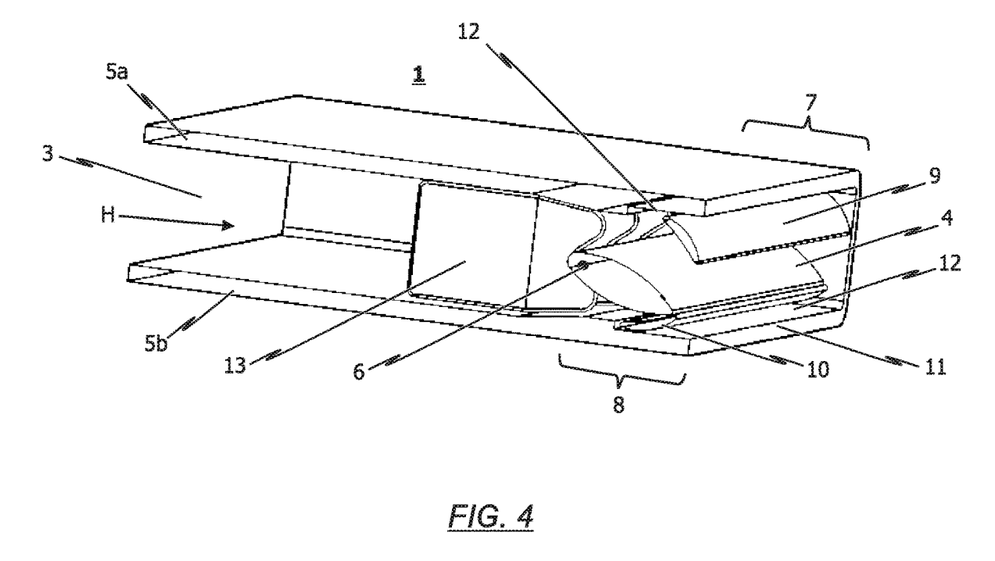
FIG. 4 shows schematically and in an isometric and partially sectional view the air vent according to FIG. 3.
Figure 5:
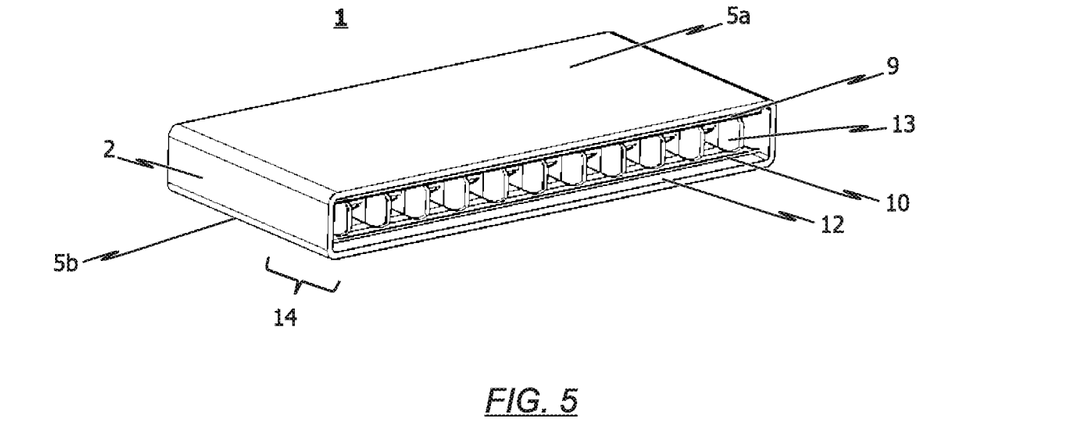
FIG. 5 shows schematically and in an isometric view a second exemplary embodiment of the air vent according to the invention in the neutral position.

As can be inferred in particular from the sectional representations according to FIG. 2 and FIG. 4, adaptive regions 7, 8, designed in each case in the form of air-guiding elements 9, 10, of housing walls 5a, 5b are arranged, at least partially and/or regionally, in corresponding groove-shaped regions 12, which extend perpendicular to main flow direction H and are formed in main body 11 of housing 2. Air-guiding elements 9, 10, which form adaptive region 7, 8 of housing wall 5a, 5b, are able to be pivoted, at least partially, from corresponding groove-shaped region 12 into the air flowing through air duct 3. In the illustrated embodiment, the groove-shaped regions 12 are formed by each housing wall 5a, 5b progressively thickening beginning at a location upstream, in the main flow direction H, from the groove-shaped region, and then having a stepwise decrease in thickness to create the groove-shaped region, where the increase in wall thickness is achieved at the internal duct facing sides of the housing walls 5a, 5b. Thus, a gap or spacing between the duct facing sides of the housing walls 5a, 5b is greater in the groove-shaped regions 12 than such gap or spacing is immediately upstream of the groove-shaped regions. However, other configurations to form the groove-shaped regions 12 are possible.

It can furthermore be inferred from the sectional views according to FIG. 2 and FIG. 4 that, in the case of the first exemplary embodiment of air vent 1 according to the invention, each air-guiding element 9, 10 which serves as an adaptive region of housing wall 5a, 5b has a surface which points in the direction of air duct 3 and which is, at least partially or regionally, of concave form and is embodied in particular in a complementary manner to a region of the surface of air-guiding slat 4 pointing in the direction of corresponding air-guiding element 9, 10.

A comparison of the sectional views in FIGS. 2 and 4 shows that the two adaptive regions 7, 8, designed in each case as air-guiding elements 9, 10, of housing wall 5a, 5b are pivotable in each case about an axis of rotation extending substantially perpendicular to main flow direction H relative to housing main body 11 on one hand and relative to air-guiding slat 4 on the other hand. The respective axes of rotation of the two air-guiding elements 9, 10 can (but do not have to) match one another, i.e. a joint axis of rotation can be present for both air-guiding elements 9, 10.

Although not shown explicitly in the drawings, it is advantageous if a motor-actuable, in particular electric motor-actuable, or manually actuable actuation mechanism is assigned to air-guiding slat 4 of air vent 1 according to the invention in order where necessary to be able to pivot air-guiding slat 4 relative to housing wall 5a, 5b of air vent 1.

It is provided in particular here that the two adaptive regions 7, 8, designed in each case in the form of an air-guiding element 9, 10, of housing wall 5a, 5b are operatively coupled to air-guiding slat 4 or to the actuation mechanism assigned to air-guiding slat 4 such that, when air-guiding slat 4 is pivoted relative to housing 2, air-guiding elements 9, 10, which serve as adaptive regions 7, 8 of housing wall 5a, 5b, are pivoted about their axes of rotation.

In the case of the first exemplary embodiment of air vent 1 according to the invention according to FIGS. 1 to 4, it is provided that the two adaptive regions 7, 8, designed in each case as air-guiding element 9, 10, of housing wall 5a, 5b are opposite one another, wherein air-guiding slat 4 is arranged, at least regionally, between the two air-guiding elements 9, 10.

The operative coupling between air-guiding elements 9, 10 on one hand and air-guiding slat 4 or the actuation mechanism assigned to air-guiding slat 4 on the other hand is preferably selected such that, in a state in which air-guiding slat 4 is, with respect to main flow direction H, in its straight-ahead position (cg. FIG. 1 and FIG. 2), a first sub-duct is formed between lower (first) air-guiding element 9, 10 and air-guiding slat 4 and a second sub-duct is formed between upper (second) air-guiding element 9, 10 and air-guiding slat 4.

On the other hand, the operative coupling between air-guiding elements 9, 10 on one hand and air-guiding slat 4 on the other hand is selected such that, in a state in which the air-guiding slat 4 is, about its axis of rotation 6, pivoted relative to housing 2 of air vent 1 in the direction of first air-guiding element 4, the effective flow cross section of the first sub-duct is reduced in comparison with the effective flow cross section of the first sub-duct in the neutral position of air vent 1, while the effective flow cross section of the second sub-duct remains, at least substantially, unchanged.

Figure 3:
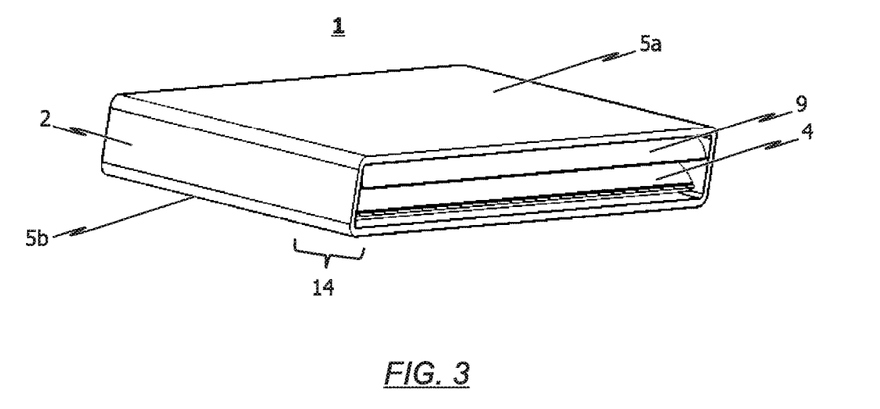
FIG. 3 shows schematically and in an isometric view the air vent according to the first exemplary embodiment in a maximal position.

It can furthermore be inferred from the representation in FIGS. 3 and 4 that, in the maximal position of air vent 1, i.e. in a state in which air-guiding slat 4 is, about its axis of rotation 6, pivoted relative to housing 2 to a maximum extent in the direction of first (or second) air-guiding element 9, 10, the first (or second) sub-duct is blocked by first (or second) air-guiding element 9, 10, wherein the effective flow cross section of the other sub-duct is at least substantially unchanged in comparison with the state in which air-guiding slat 4 is in its straight-ahead position.

In the case of the first exemplary embodiment of air vent 1 according to the invention, the vertical air deflection is brought about by the use of two pivotable air-guiding element 9, 10 on the front upper and lower edge, on the inside of housing 2 as well as horizontal air-guiding slat 4 inside housing 2. Horizontal air-guiding slat 4 located inside moves up and down with outer pivotable air-guiding elements 9, 10—depending on the desired deflection. Air-guiding elements 9, 10 are controlled in their movement which is dependent on horizontal air-guiding slat 4 such that they are located in each case in the ideal position for air deflection.

If horizontal air-guiding slat 4 is moved into the upper maximal position in order to deflect the air maximally upward, upper air-guiding element 9, 10 retracts into housing 2 or into housing main body 11 of housing 2 and thus releases the maximal cross section. Horizontal air-guiding slat 4 comes to almost bear against upper air-guiding element 9, 10 and thus shuts off the air throughflow above air-guiding slat 4.

At the same time, lower air-guiding element 9, 10 in its maximal position moves upward and thus forms a bulge at the bottom of housing 2. Together with preferably inclined air-guiding slat 4, a narrow air duct is thus formed which directs the air flow upward.

For downward air deflection, horizontal air-guiding slat 4 is correspondingly moved downward. Both air-guiding elements 9, 10 follow this movement. Lower air-guiding element 9, 10 retracts and upper air-guiding element 9, 10 extends to its maximal position. As a result, a bulge is again generated on housing 2. As a result of this, a narrow air duct is formed, the air flow of which is directed downward.

Air-guiding slat 4 almost comes to bear against upper air-guiding element 9, 10 and thus blocks the air flow below air-guiding slat 4.

The invention is of course not restricted to a horizontal installation situation; on the contrary, a vertical installation situation or an installation situation between horizontal and vertical is also conceivable.

According to embodiments, it is advantageous if deflections between, for example, 35° and 40° (top/bottom) are achieved.

In order to operatively couple air-guiding slat 4 to air-guiding elements 9, 10, it is conceivable if air-guiding slat 4 sits on an axis of rotation 6 which is controlled, for example, via an operating wheel and is pivoted in this manner. There sits, for example, on air-guiding slat 4 an operating knob with which the corresponding deflection in the horizontal direction (right/left), which is controlled, for example, via rear, vertically oriented air-guiding slat pack 13, is carried out.

In a further embodiment, an air-guiding slat 4 which is visible from the outside can be dispensed with. Air-guiding slat 4 required for air guiding is positioned further upstream in housing 2, for example, behind the vertically oriented air-guiding slat pack for the right/left deflection. Such a system naturally has advantages in the case of the right/left deflection since the elements responsible for this can be placed further to the front in housing 2.

In this context, reference is made to the second exemplary embodiment of air vent 1 according to the invention which is shown schematically in FIGS. 5 to 8.

As also in the case of the first exemplary embodiment described above of air vent 1 according to the invention, air vent 1 according to the invention according to the second exemplary embodiment has a first air-guiding element 9, 10, designed in the form of an adaptive region of housing wall 5a, 5b, as well as a second air-guiding element 9, 10, also designed in the form of an adaptive region of housing wall 5a, 5b, wherein these two air-guiding elements 9, 10 are opposite one another.

In contrast to the first exemplary embodiment of air vent 1 according to the invention, in the case of the second exemplary embodiment, air-guiding elements 9, 10 which serve as an adaptive region of housing wall 5a, 5b are arranged downstream of air-guiding slat 4.

Air-guiding slat 4 required for the air guidance is positioned further upstream (i.e. behind) in housing 2. As indicated in FIG. 6 or FIG. 8, a slat pack 13 with further air-guiding slats can be provided between air-guiding slat 4, which in the example shown serves the purpose of vertical air deflection, wherein these further air-guiding slats are oriented perpendicular to air-guiding slat 4 for the vertical air deflection and serve the purpose of horizontal deflection of the air flow flowing through air vent 1.

Such a system has advantages in the case of horizontal air deflection since the elements responsible for this can be placed further to the front in housing 2, i.e. closer to outflow region 14 of air vent 1.

As also in the case of the first exemplary embodiment, in the case of the second exemplary embodiment of air vent 1 according to the invention, it is provided that air-guiding slat 4 can be manipulated for vertical air deflection via a corresponding actuation mechanism. It is furthermore provided that air-guiding elements 9, 10 are operatively coupled to air-guiding slat 4 or to the correspondingly assigned actuation mechanism so that air-guiding elements 9, 10 are correspondingly automatically adjusted with air-guiding slat 4.

Figure 6:
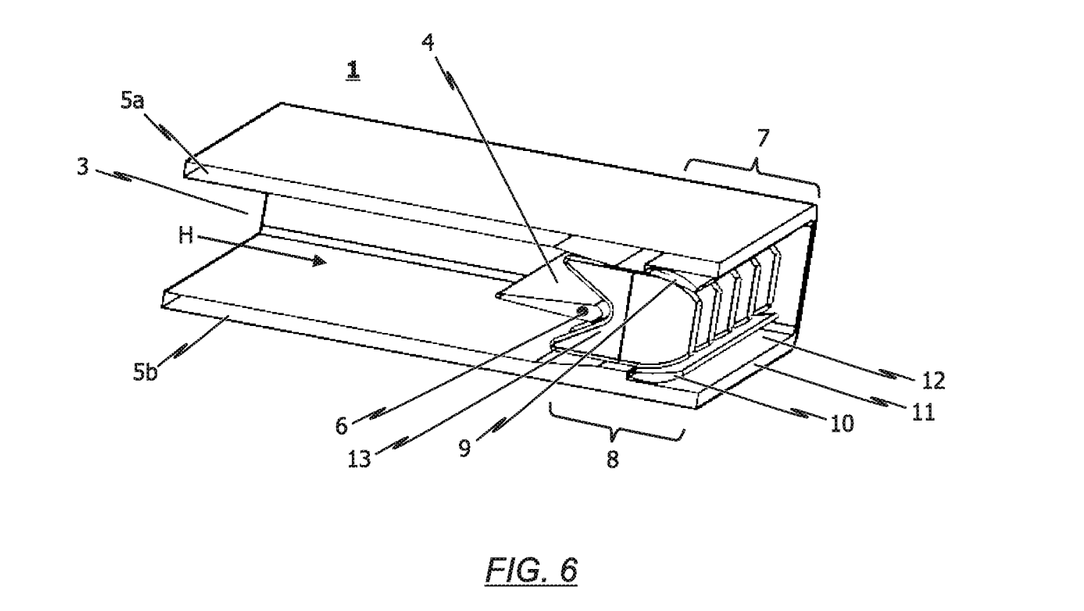
FIG. 6 shows schematically and in an isometric and partially sectional view the air vent according to FIG. 5.
Figure 7:
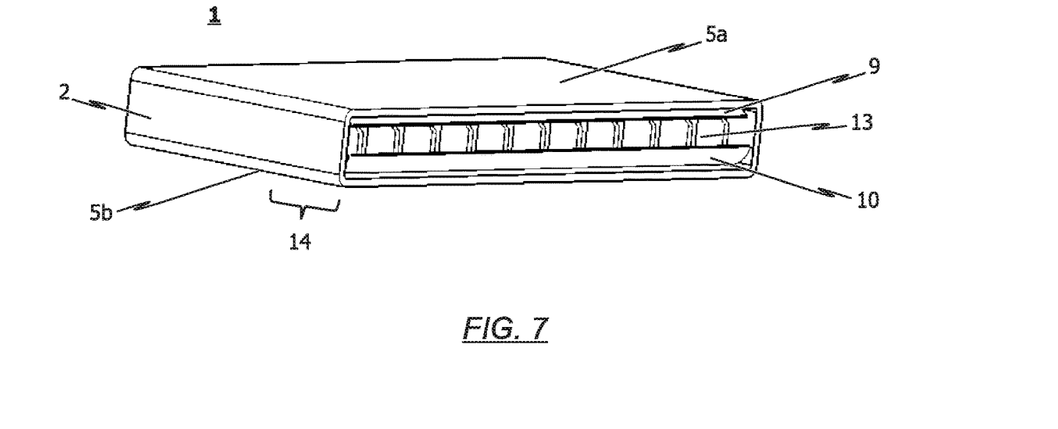
FIG. 7 shows schematically and in an isometric view the air vent according to the second exemplary embodiment in a maximal position.
Figure 8:
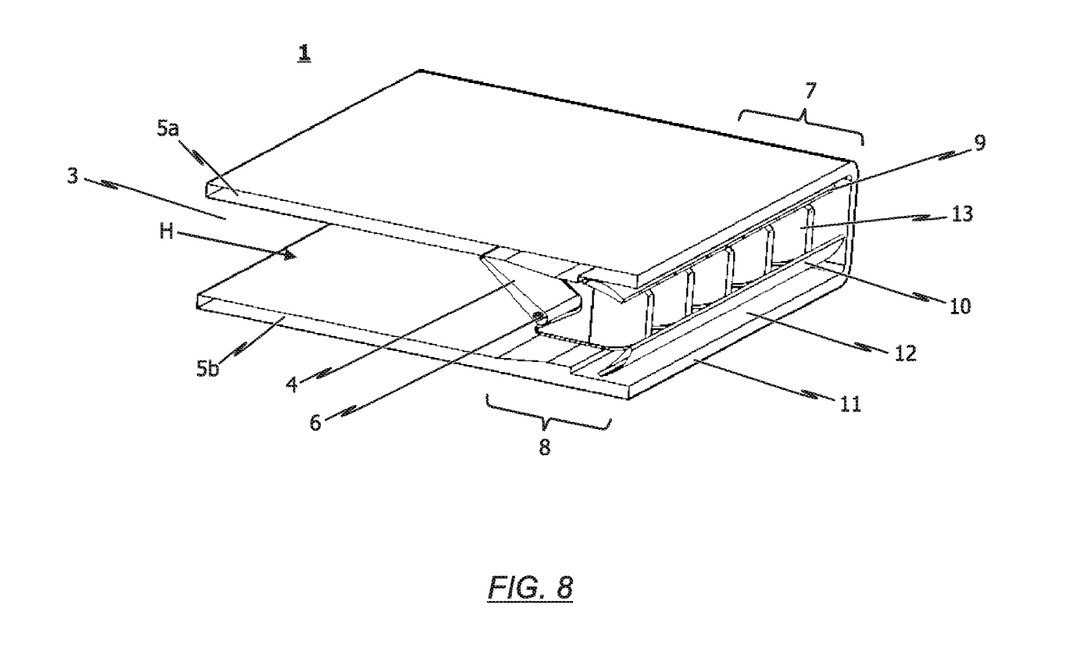
FIG. 8 shows schematically and in an isometric and partially sectional view the air vent according to FIG. 7.

A comparison of the sectional views according to FIG. 6 and according to FIG. 8 shows that the operative coupling between air-guiding elements 9, 10 on one hand and air-guiding slat 4 or the correspondingly assigned actuation mechanism on the other hand is preferably selected such that, in a state in which air-guiding slat 4 is in its straight-ahead position (cf. FIG. 5 and FIG. 6), a first (upper) sub-duct and a second (lower) sub-duct extending parallel hereto are formed between air-guiding slat 4 and housing 2.

If, however, air-guiding slat 4 is pivoted about its axis of rotation 6 relative to housing 2 in the direction of that housing wall 5a in which first air-guiding element 9 designed as an adaptive region is provided, the effective flow cross section of the second sub-duct is reduced in comparison with the effective flow cross section of the second sub-duct in the straight-ahead position of air-guiding slat 4 by air-guiding slat 4, wherein at the same time first air-guiding element 9 is pivoted into air duct 3 in order in this manner to bring about a deflection of the air flow.

In detail, in the case of the second exemplary embodiment of air vent 1 according to the invention, it is provided that axis of rotation 6 of air-guiding slat 4 extends through a downstream region of air-guiding slat 4. The second sub-duct is preferably entirely blocked by air-guiding slat 4 if air-guiding slat 4 is in a state in which it is pivoted about its axis of rotation 6 relative to housing 2 to a maximum extent in the direction of that housing wall 5a in which first air-guiding element 9 designed as an adaptive region is provided.

In other words, if horizontal air-guiding slat 4 which lies further to the rear is moved into the upper maximal position (cf. FIG. 7 and FIG. 8) in order to deflect the air maximally upward, upper air-guiding element 9 retracts into housing 2 or into main body 11 of housing 2 of air vent 1 and thus releases the maximal cross section. Vertical air-guiding slat 4 shuts off the air throughflow above air-guiding slat 4 and steers the air flow onto the underside of housing 2. At the same time, lower air-guiding element 10 in its maximal position moves upward and thus forms the bulge on housing 2 which directs the air flow upward.

For downward air deflection, horizontal air-guiding slat 4 is correspondingly moved downward. Here, the air flow on the underside of air-guiding slat 4 is shut off and deflected to the upper side of housing 2. Both air-guiding elements 9, 10 arranged downstream follow the movement of air-guiding slat 4.

Lower air-guiding element 10 retracts into housing 2 or into main body 11 of housing 2 of air vent 1 and upper air-guiding element 9 extends to its maximal position. As a result of this, a bulge on the upper side of housing 2 is formed which thus directs the air flow downward.

The kinematics for control of air-guiding elements 9, 10 via the movement of air-guiding slat 4 can in principle be performed, for example, via coupling rods. The advantage here is that sliding block guides, which tend to jam, can be avoided.

Control via sliding block guides is nevertheless of course conceivable. Transmission arrangements with gear wheels are furthermore also conceivable.

Motor-driven controls for horizontal air-guiding slat 4 and air-guiding elements 9, 10 are also possible.

In further embodiments, combinations of these above-mentioned principles cannot be ruled out. Housing 2 of air vent 1 is advantageously—as seen in cross section—embodied to be rectangular or at least substantially rectangular, wherein preferably all opposite housing walls extend at least substantially parallel in particular over the entire length of housing 2.

It is furthermore conceivable to arrange several air vents 1 on top of one another.

The solution according to the invention makes it possible to construct air vents 1 in the case of which the distance between two opposite housing walls (in particular of upper and lower housing wall 5a, 5b) above all in the outflow region of air vent 1 is at most 60 mm, preferably at most 30 mm and more preferably at most 20 mm.

The invention furthermore relates to a venting system for a vehicle, wherein this venting system has at least one air vent 1 of the type according to the invention.

LIST OF REFERENCE NUMBERS

1 Air vent
2 Housing
3 Air duct
4 Air-guiding slat/horizontal air-guiding slat
5a, b Upper/lower housing wall
6 Axis of rotation of the air-guiding slat
7 First adaptive region
8 Second adaptive region
9 First air-guiding element
10 Second air-guiding element
11 Main body of the housing
12 Groove-shaped region
13 Slat pack with vertical air-guiding slats
14 Outflow region
H Main flow direction H

The invention claimed is:

1. An air vent for a vehicle, comprising:
a housing whose housing wall regionally delimits an air duct for air flowing through the air vent along a main flow direction, wherein at least one region of the housing wall is designed adaptively such that said at least one region is able to be moved out into the air duct and/or pivoted into the air duct, as required, in order to deflect the air, flowing through the air duct, from the main flow direction;
wherein the at least one adaptive region of the housing wall has a surface which points in the direction of the air duct and which is, at least regionally, of concave form;
wherein, in the air duct of the air vent, at least one air-guiding slat is arranged in a manner pivotable relative to the housing about an axis of rotation, and wherein the at least one adaptive region of the housing wall lies in a plane extending parallel or substantially parallel to the axis of rotation of the at least one air-guiding slat;
wherein the surface of the at least one adaptive region of the housing wall is complementary to a surface of the at least one air-guiding slat that faces the surface of the at least one adaptive region of the housing wall.

2. The air vent as claimed in claim 1,
wherein the at least one adaptive region of the housing wall is designed in the form of an air-guiding element, wherein the air-guiding element is arranged on or integrated in a main body of the housing and is able to be pivoted relative to the main body of the housing about an axis of rotation extending perpendicular to the main flow direction.

3. The air vent as claimed in claim 1,
wherein the at least one adaptive region is designed in the form of an air-guiding element that is arranged, at least partially and/or regionally, in a groove-shaped region, which extends perpendicular to the main flow direction and is formed in a main body of the housing, and the air-guiding element is able to be moved out or pivoted, at least partially, from the groove-shaped region into the air flowing through the air duct as required.

4. The air vent as claimed in claim 1,
wherein the at least one adaptive region of the housing wall is operatively coupled to the at least one air-guiding slat such that the at least one adaptive region of the housing wall is moved out into the air duct, and/or pivoted into the air duct, in dependence on a direction in which the at least one air-guiding slat is pivoted relative to the housing and/or in dependence on a degree of the deflection of the at least one air-guiding slat.

5. The air vent as claimed in claim 1,
wherein the at least one adaptive region of the housing wall is formed in a region of the housing wall downstream of a virtual line extending orthogonal or substantially orthogonal to the main flow direction, wherein the virtual line extends parallel to the axis of rotation of the at least one air-guiding slat and is oriented orthogonally with respect to the main flow direction.

6. The air vent as claimed in claim 1,
wherein the at least one adaptive region is designed in the form of an air-guiding element has an axis of rotation, which extends perpendicular to the main flow direction, and about which the air-guiding element is able to be pivoted relative to the at least one air-guiding slat.

7. The air vent as claimed in claim 1,
wherein an actuation mechanism is assigned to the at least one air-guiding slat for the purpose of pivoting the at least one air-guiding slat relative to the housing wall of the air vent as required, and wherein the at least one adaptive region, is designed in the form of an air-guiding element and is operatively coupled to the at least one air-guiding slat or to the actuation mechanism assigned to the at least one air-guiding slat such that, when the at least one air-guiding slat is pivoted, the air-guiding element is also pivoted about its axis of rotation.

8. The air vent as claimed in claim 7,
wherein the housing wall comprises a first housing wall segment and a second housing wall segment spaced apart across the air duct from the first housing wall segment;
wherein the at least one adaptive region comprises a first adaptive region of the first housing wall segment and a second adaptive region of the second housing wall segment;
wherein the first adaptive region comprises a first air-guiding element, wherein the second adaptive region comprises a second air-guiding element, wherein the first air-guiding element and the second air-guiding element are opposite one another or are opposite one another in an offset manner, and wherein the at least one air-guiding slat is arranged, at least regionally, between the first and second air-guiding elements, wherein the first and second air-guiding elements are operatively coupled to the at least one air-guiding slat such that, in a state in which the at least one air-guiding slat is, with respect to the main flow direction, in its straight-ahead position, a first sub-duct is formed between the first air-guiding element and the at least one air-guiding slat and a second sub-duct is formed between the second air-guiding element and the at least one air-guiding slat, and such that, in a state in which the at least one air-guiding slat is, about its axis of rotation, pivoted in the direction of the first air-guiding element, an effective flow cross section of the first sub-duct is reduced in comparison with the effective flow cross section in the case of the straight-ahead position of the at least one air-guiding slat, while an effective flow cross section of the second sub-duct remains, at least substantially, unchanged.

9. The air vent as claimed in claim 8,
wherein the first and second air-guiding elements are operatively coupled to the at least one air-guiding slat such that, in a state in which the at least one air-guiding slat is, about its axis of rotation, pivoted relative to the housing to a maximum extent in the direction of the first air-guiding element, the first sub-duct is blocked by the first air-guiding element, wherein the effective flow cross section of the second sub-duct is at least substantially unchanged in comparison with the state in which the at least one air-guiding slat is in its straight-ahead position.

10. The air vent as claimed in claim 1,
wherein the housing wall comprises a first housing wall segment and a second housing wall segment spaced apart across the air duct from the first housing wall segment;
wherein the at least one adaptive region comprises a first adaptive region of the first housing wall segment and a second adaptive region of the second housing wall segment;
wherein the first adaptive region comprises a first air-guiding element, wherein the second adaptive region comprises a second air-guiding element, wherein the first air-guiding element and the second air-guiding element are opposite one another and are arranged downstream of the at least one air-guiding slat, wherein the first and second air-guiding elements are operatively coupled to the at least one air-guiding slat such that, in a state in which the at least one air-guiding slat is in its straight-ahead position, a first sub-duct is formed between the at least one air-guiding slat and the first housing wall segment and a second sub-duct, extending parallel to the first sub-duct, is formed between the at least one air-guiding slat and the second housing wall segment, and such that, in a state in which the at least one air-guiding slat is, about its axis of rotation, pivoted in the direction of the first housing wall segment, an effective flow cross section of the second sub-duct is reduced and the first air-guiding element is pivoted into the air duct.

11. The air vent as claimed in claim 10,
wherein, in a state in which the at least one air-guiding slat is, about its axis of rotation, pivoted to a maximum extent in the direction of the first housing wall segment, the second sub-duct is blocked by the at least one air-guiding slat.

12. The air vent as claimed in claim 10,
wherein the axis of rotation of the at least one air-guiding slat extends through a downstream region of the at least one air-guiding slat, and wherein provided between the at least one air-guiding slat and the first and second air-guiding elements is a slat pack having further air-guiding slats, wherein the further air-guiding slats of the slat pack are oriented perpendicular to the at least one air-guiding slat.

13. The air vent as claimed in claim 1, wherein a shape of the concave form of the surface of the at least one adaptive region faces away from housing wall.

14. A venting system for a vehicle, wherein the venting system has at least one air vent as claimed in claim 1.

* * * * *